(12) United States Patent
Imai et al.

(10) Patent No.: US 9,205,735 B2
(45) Date of Patent: Dec. 8, 2015

(54) HYBRID VEHICLE POWER TRANSMISSION DEVICE

(75) Inventors: Keita Imai, Toyota (JP); Koichi Okuda, Toyota (JP); Mitsuhiro Toyoda, Toyota (JP); Atsushi Tabata, Okazaki (JP); Sho Mizushino, Chiryu (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/361,115

(22) PCT Filed: Nov. 29, 2011

(86) PCT No.: PCT/JP2011/077585
§ 371 (c)(1),
(2), (4) Date: May 28, 2014

(87) PCT Pub. No.: WO2013/080311
PCT Pub. Date: Jun. 6, 2013

(65) Prior Publication Data
US 2014/0342872 A1    Nov. 20, 2014

(51) Int. Cl.
| | | |
|---|---|---|
| *F16H 3/72* | (2006.01) | |
| *B60K 6/50* | (2007.10) | |
| *B60K 6/26* | (2007.10) | |
| *B60K 6/40* | (2007.10) | |
| *B60K 6/445* | (2007.10) | |

(Continued)

(52) U.S. Cl.
CPC ... *B60K 6/50* (2013.01); *B60K 6/26* (2013.01); *B60K 6/40* (2013.01); *B60K 6/445* (2013.01); *B60K 6/547* (2013.01); *B60W 10/02* (2013.01); *B60W 10/08* (2013.01); *B60W 20/1084* (2013.01); *B60W 20/40* (2013.01); *B60W 2710/083* (2013.01); *Y02T 10/6239* (2013.01); *Y10S 903/902* (2013.01); *Y10T 477/26* (2015.01)

(58) Field of Classification Search
CPC ............ B60K 6/50; B60K 6/547; B60K 6/40; B60K 6/445; B60K 6/26; B60W 10/02; B60W 20/40; B60W 20/1084; B60W 10/08; B60W 2710/083
USPC ............. 475/5, 311, 331, 288, 313, 220, 221, 475/225, 248, 252, 253; 477/5, 3
See application file for complete search history.

(56) References Cited

U.S. PATENT DOCUMENTS

| | | | | |
|---|---|---|---|---|
| 2,015,430 | A | * | 9/1935 | Matthews et al. .............. 464/179 |
| 2,466,097 | A | * | 4/1949 | Graue ............................ 403/356 |

(Continued)

FOREIGN PATENT DOCUMENTS

| | | |
|---|---|---|
| JP | 11-93725 | 4/1999 |
| JP | 2006-94680 | 4/2006 |

(Continued)

*Primary Examiner* — David J Hlavka
(74) *Attorney, Agent, or Firm* — Finnegan, Henderson, Farabow, Garrett & Dunner, LLP

(57) ABSTRACT

A power transmission device of a hybrid vehicle comprises: an electric differential portion having a first rotating element coupled to an engine, a second rotating element coupled to a first rotator, and a third rotating element coupled to a second rotator, the second rotator being disposed in a power transmission path including the third rotating element between the engine and drive wheels, the second rotator having a rotor shaft interposed in series in the power transmission path, a rotor of the second rotator being fixed, and making up a portion of the power transmission path.

5 Claims, 3 Drawing Sheets

(51) Int. Cl.
  *B60K 6/547*   (2007.10)
  *B60W 20/00*   (2006.01)
  *B60W 10/08*   (2006.01)
  *B60W 10/02*   (2006.01)

(56) References Cited

U.S. PATENT DOCUMENTS

| | | | |
|---|---|---|---|
| 5,967,940 | A | 10/1999 | Yamaguchi |
| 7,239,033 | B2 * | 7/2007 | Motoike et al. ............. 290/40 C |
| 8,337,350 | B2 * | 12/2012 | Kakinami et al. ................ 475/5 |
| 2005/0204862 | A1 | 9/2005 | Reed et al. |
| 2007/0213161 | A1 | 9/2007 | Tabata et al. |
| 2007/0225098 | A1 | 9/2007 | Tabata et al. |
| 2009/0227416 | A1 | 9/2009 | Kakinami et al. |
| 2009/0302720 | A1 | 12/2009 | Chiba |
| 2010/0069192 | A1 * | 3/2010 | Tabata ............................. 475/5 |
| 2010/0222171 | A1 | 9/2010 | Tabata et al. |

FOREIGN PATENT DOCUMENTS

| | | |
|---|---|---|
| JP | 2006-194299 | 7/2006 |
| JP | 2007-1450 | 1/2007 |
| JP | 2007-253823 | 10/2007 |
| JP | 2012-17007 | 1/2012 |
| WO | WO 2006/121045 A1 | 11/2006 |

* cited by examiner

HYBRID VEHICLE POWER TRANSMISSION DEVICE

CROSS-REFERENCE TO RELATED APPLICATIONS

This application is a national phase application of International Application No. PCT/JP2011/077585, filed Nov. 29, 2011, the content of which is incorporated herein by reference.

TECHNICAL FIELD

The present invention relates to a power transmission device of a hybrid vehicle and particularly to a technique of improving fuel efficiency of the hybrid vehicle.

BACKGROUND ART

For example, power transmission devices of hybrid vehicles as described in Patent Document 1 to 4 exist. As described in Patent Document 1, such a power transmission device of a hybrid vehicle selectively transmits output of an engine, for example, an engine, and output of a rotator to drive wheels.

The power transmission device of a hybrid vehicle of Patent Document 1 includes an electric differential portion having a first rotating element, a second rotating element, and a third rotating element coupled to the engine, a first rotator, and a second rotator acting as the rotator, respectively, as depicted in FIG. 1 of Patent Document 1 such that the third rotating element, i.e., an output shaft, of the electric differential portion is coupled to drive wheels, that a rotor shaft of the second rotator is coupled via a meshing mechanism to a rotating member making up a portion of a power transmission path from the electric differential portion to the drive wheels, and that the output from the rotor shaft of the second rotator is transmitted to the drive wheels.

In the power transmission device of a hybrid vehicle as described above, when the output of the second rotator is absent or small, the rotor shaft of the second rotator enters a floating state and, if power including rotation variation from the engine is transmitted, teeth surfaces hit with each other between a meshing tooth of the rotor shaft and a meshing tooth meshed therewith on the rotation member side, and so-called tooth hitting noise or rattling noise may problematically occur.

In this regard, a power transmission device of a hybrid vehicle as described in Patent Document 5 exists. This power transmission device of a hybrid vehicle changes the engine rotation number to reduce tooth hitting if a condition of occurrence of tooth hitting of gears is detected in a drive train of the hybrid vehicle.

PRIOR ART DOCUMENTS

Patent Documents

Patent Document 1: Japanese Laid-Open Patent Publication No. 2007-253823
Patent Document 2: Japanese Laid-Open Patent Publication No. 2006-194299
Patent Document 3: Japanese Laid-Open Patent Publication No. 2007-1450
Patent Document 4: US2005/0204862A1
Patent Document 5: Japanese Laid-Open Patent Publication No. 11-93725

SUMMARY OF THE INVENTION

Problem to be Solved by the Invention

However, when the condition of occurrence of tooth hitting is detected in the power transmission device of a hybrid vehicle of Patent Document 5 as described above, if the rotation number of an engine is increased with an output state of a drive shaft maintained, an operating point of the engine deviates from a preset optimum curve, causing a problem of deterioration in vehicle fuel efficiency.

The present invention was conceived in view of the situations and it is therefore an object of the present invention to provide a power transmission device of a hybrid vehicle capable of suppressing tooth hitting noise without changing an operating point of an engine even when a torque of a second rotator comes close to zero.

Means for Solving the Problem

To achieve the object, the first aspect of the present invention provides a power transmission device of a hybrid vehicle comprising (a): an electric differential portion having a first rotating element coupled to an engine, a second rotating element coupled to a first rotator, and a third rotating element coupled to a second rotator, the second rotator being disposed in a power transmission path including the third rotating element between the engine and drive wheels, (b) the second rotator having a rotor shaft interposed in series in the power transmission path, a rotor of the second rotator being fixed, and making up a portion of the power transmission path.

The second aspect of the present invention provides a power transmission device of a hybrid vehicle comprising: (a) an electric differential portion having a first rotating element coupled to an engine, a second rotating element coupled to a first rotator, and a third rotating element coupled to a second rotator, the second rotator being disposed in a power transmission path including the third rotating element between the engine and drive wheels, (b) the second rotator having a rotor shaft being a component interposed between a bearing rotatably supporting a rotor of the second rotator to a non-rotating member and the rotor, and making up a portion of the power transmission path.

The third aspect of the present invention provides a power transmission device of a hybrid vehicle comprising: (a) an electric differential portion having a first rotating element coupled to an engine, a second rotating element coupled to a first rotator, and a third rotating element coupled to a second rotator, the second rotator being disposed in a power transmission path including the third rotating element between the engine and drive wheels, comprising: (b) a first transmitting member coupled in a power transmittable manner to the third rotating element, and a second transmitting member coupled in a power transmittable manner to the drive wheels and formed separately from the first transmitting member, (c) a rotor shaft of the second rotator being coupled, respectively, to the first transmitting member and the second transmitting member, and the first transmitting member and the second transmitting member being separated each other.

Effects of the Invention

According to the power transmission device of the hybrid vehicle of this invention, (b) the rotor shaft of the second rotator is a component interposed between the pair of bearings rotatably supporting the rotor of the second rotator to a non-rotating member and the rotor, and makes up a portion of the power transmission path. Therefore, while the output of the engine is transmitted through the rotor shaft of the second rotator to the drive wheels, even when the torque of the second rotator comes close to zero, a meshing tooth of the rotor shaft of the second rotator is always pressed against one side during operation of the engine and the coupling portion of the second rotator does not rattle. Thus, even when the torque of the second rotator comes close to zero, tooth hitting noise is suppressed without changing the operating point of the engine and the fuel efficiency of the hybrid vehicle is improved.

Preferably, output of the engine is transmitted through the rotor shaft of the second rotator to the drive wheels. Therefore, while the output of the engine is transmitted through the rotor shaft of the second rotator to the drive wheels, even when the torque of the second rotator comes close to zero, a meshing tooth of the rotor shaft of the second rotator is always pressed against one side during operation of the engine and the coupling portion of the second rotator does not rattle.

Preferably, (a) the rotor shaft of the second rotator has a pair of inner circumferential spline teeth formed respectively on both end portions thereof, and (b) the pair of the inner circumferential spline teeth are respectively spline-fitted to a member positioned upstream of the second rotator and a member positioned downstream of the second rotator in the power transmission path. Therefore, the pair of the inner circumferential spline teeth formed on the rotor shaft of the second rotator can preferably make the entire length of the power transmission device shorter in the axial direction of the rotor shaft.

Preferably, the inner circumferential spline teeth formed on the both end portions of the rotor shaft of the second rotator are mutually set to the same diameter. Therefore, the inner circumferential spline teeth formed on the both end portions of the rotor shaft of the second rotator can be formed by using the same machining equipment/cutting tools, which improves the productivity of the rotor shaft of the second rotator.

Preferably, the rotor shaft of the second rotator is a cylindrical shaft, and wherein the inner circumferential spline teeth formed on the both end portions are continuous in axial direction. Therefore, the inner circumferential spline teeth formed on the both end portions of the rotor shaft of the second rotator can be manufactured by one branching in the axial direction of the rotor shaft, which preferably improves the productivity of the rotor shaft of the second rotator.

Preferably, (a) the rotor shaft of the second rotator has a pair of an inner circumferential spline tooth and an outer circumferential spline tooth formed on one shaft end portion thereof, and (b) the pair of the inner circumferential spline tooth and the outer circumferential spline tooth is respectively spline-fitted to a member positioned upstream of the second rotator and a member positioned downstream of the second rotator in the power transmission path. Therefore, although the output torque of the second rotator is more added to the member positioned downstream of the second rotator in the power transmission path than the member positioned upstream of the second rotator in the power transmission path and the required strength of the member positioned downstream of the second rotator must be made relatively larger, the diameter of the member positioned downstream of the second rotator can preferably be made larger to ensure the strength by disposing the member positioned downstream of the second rotator on the outer circumferential side of the rotor shaft of the second rotator and, because the member positioned upstream of the second rotator is disposed on the inner circumferential side of the rotor shaft of the second rotator, the diameter of the member may not be made larger in an unnecessary manner and, thus, miniaturization can be achieved.

MODES FOR CARRYING OUT THE INVENTION

An embodiment of the present invention will now be described in detail with reference to the drawings. In the following embodiment, the figures are simplified or deformed as needed for facilitating understanding and portions are not necessarily precisely depicted in terms of dimension ratio, shape, etc.

First Embodiment

Figure 1:
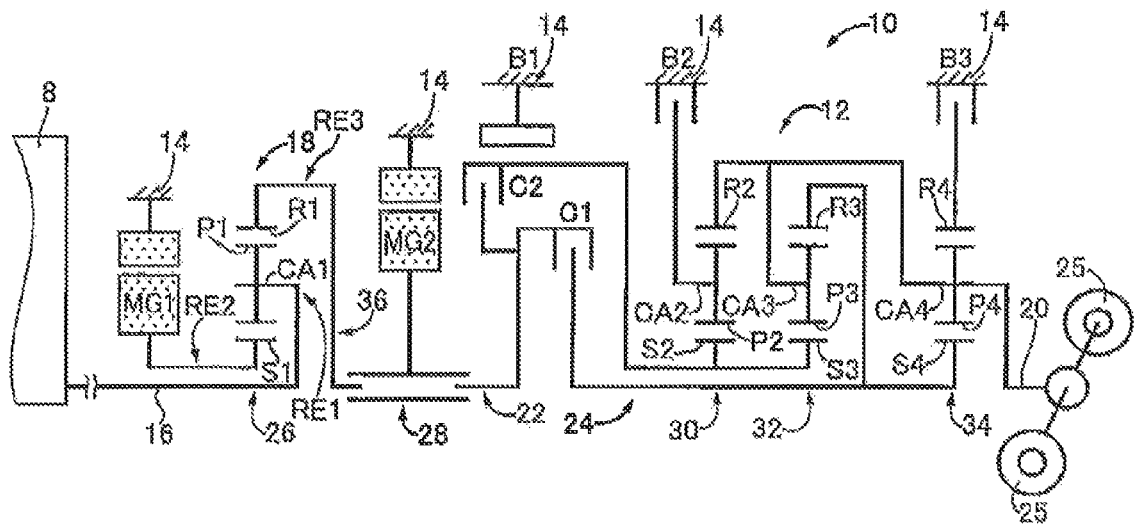
FIG. 1 is a schematic for explaining a power transmission device of a hybrid vehicle that is an embodiment of the present invention.

FIG. 1 is a schematic for explaining a power transmission device 12 of a hybrid vehicle (hereinafter referred to as a vehicle 10) 10 that is an embodiment of the present invention. The power transmission device 12 is preferably used in an FR (front-engine rear-drive) vehicle in which the power transmission device 12 is longitudinally mounted on the vehicle 10, for example.

In FIG. 1, the power transmission device 12 includes a power transmission device input shaft (hereinafter referred to as an input shaft 16) 16 acting as an input rotating member disposed on a common axis in a transmission case 14 (hereinafter referred to as a case 14) acting as a non-rotating member attached to a vehicle body, a power distribution mechanism (electric differential portion) 18 acting as a differential mechanism coupled to the input shaft 16 directly or indirectly via a pulse absorption dumper not depicted etc., a stepped automatic transmission 24 serially coupled via a transmitting member 22 between the power distribution mechanism 18 and a power transmission device output shaft (hereinafter referred to as an output shaft 20) 20, and the output shaft 20 acting as an output rotating member coupled to the automatic transmission 24.

The power transmission device 12 is disposed between an engine 8 acting as a drive force source for running and a pair of drive wheels 25 not depicted and transmits the output of the engine 8 sequentially through a differential gear device and a pair of axles etc. to the pair of the drive wheels 25.

The power distribution mechanism 18 is a mechanical mechanism mechanically combining or distributing the output of the engine 8 input to the input shaft 16 and distributes the output of the engine 8 to a first electric motor (first rotator) MG1 and the transmitting member 22, or combines the output of the engine 8 and the output of the first electric motor MG1 before output to the transmitting member 22. Although the first electric motor MG1 and a second electric motor (second rotator) MG2 of this embodiment are so-called motor generators also having an electric generation function, the first electric motor MG1 at least has a generator (electric generation)

function for generating reaction force and the second electric motor MG2 at least has a motor (electric motor) function for outputting a drive force.

The engine 8 is a known internal combustion engine such as a gasoline engine and a diesel engine, for example, and is configured such that an engine rotation speed and an engine torque are changed by electrically controlling an intake air amount, a fuel supply amount, ignition timing, etc. with an electronic control device not depicted mainly made up of a microcomputer. For example, the electronic control device operates the engine 8 along an optimum curve empirically obtained and stored in advance such that the drivability of the vehicle and the fuel efficiency of the engine 8 are satisfied at the same time in two-dimensional coordinates made up of engine rotation speed and engine toque, and controls the engine 8 and the first electric motor MG1 so as to achieve the engine rotation speed and the engine torque from which target engine output is acquired.

The power distribution mechanism 18 includes a single pinion type first planetary gear device 26. The first planetary gear device 26 includes as rotating elements a first sun gear S1, a first planetary gear P1, a first carrier CA1 supporting the first planetary gear P1 in a rotatable and revolvable manner, and a first ring gear R1 meshed via the first planetary gear P1 with the first sun gear S1. In the first planetary gear device 26, the first carrier CA1 corresponds to a first rotating element RE1; the first sun gear S1 corresponds to a second rotating element RE2; and the first ring gear R1 corresponds to a third rotating element RE3.

In the power distribution mechanism 18, the first carrier CA1 is coupled to the input shaft 16, i.e., the engine 8; the first sun gear S1 is coupled to the first electric motor MG1; and the ring gear R1 is coupled via a rotor shaft 28 of the second electric motor MG2 to the transmitting member 22.

Since the first sun gear S1, the first carrier CA1, and the first ring gear R1 are rotatable relative to each other in the power distribution mechanism 18, the output of the engine 8 is distributed to the first electric motor MG1 and the transmitting member 22; the output of the engine 8 distributed to the first electric motor MG1 causes the first electric motor MG1 to generate electricity; the second electric motor MG2 is rotationally driven by the generated electric energy or stored electric energy; and, therefore, for example, a continuously variable transmission state is achieved such that the rotation of the transmitting member 22 is continuously varied regardless of a predetermined rotation of the engine 8. In other words, the power distribution mechanism 18 acts as an electric differential portion having a differential state between an input rotation speed (rotation speed of the input shaft 16) and an output rotation speed (rotation speed of the transmitting member 22) controlled by controlling an operation state through the first electric motor MG1 and the second electric motor MG2.

The automatic transmission 24 includes a plurality of planetary gear devices, i.e., a single pinion type second planetary gear device 30, a single pinion type third planetary gear device 32, and a single pinion type fourth planetary gear device 34. The second planetary gear device 30 includes a second sun gear S2, a second planetary gear P2, a second carrier CA2 supporting the second planetary gear P2 in a rotatable and revolvable manner, and a second ring gear R2 meshed via the second planetary gear P2 with the second sun gear S2. The third planetary gear device 32 includes a third sun gear S3, a third planetary gear P3, a third carrier CM supporting the third planetary gear P3 in a rotatable and revolvable manner, and a third ring gear R3 meshed via the third planetary gear P3 with the third sun gear S3. The fourth planetary gear device 34 includes a fourth sun gear S4, a fourth planetary gear P4, a fourth carrier CA4 supporting the fourth planetary gear P4 in a rotatable and revolvable manner, and a fourth ring gear R4 meshed via the fourth planetary gear P4 with the fourth sun gear S4.

In the automatic transmission 24, the second sun gear S2 and the third sun gear S3 are integrally coupled and are selectively coupled via a second clutch C2 to the transmitting member 22 and selectively coupled via a first brake B1 to the case 14; the second carrier CA2 is selectively coupled via a second brake B2 to the case 14; the fourth ring gear R4 is selectively coupled via a third brake B3 to the case 14; the second ring gear R2, the third carrier CA3, and the fourth carrier CA4 are integrally coupled and are coupled to the output shaft 20; and the third ring gear R3 and the fourth sun gear S4 are integrally coupled and are selectively coupled via a first clutch C1 to the transmitting member 22.

The power transmission device 12 configured as described above has a plurality of shift stages selectively established by selectively engaging and actuating, for example, any two of the first clutch C1, the second clutch C2, the first brake B1, and the second brake B2, and the third brake B3 such that a gear ratio γ (=input shaft rotation speed $N_{IN}$/output shaft rotation speed $N_{OUT}$) changed in substantially geometric progression is acquired for each gear stage.

Figure 2:
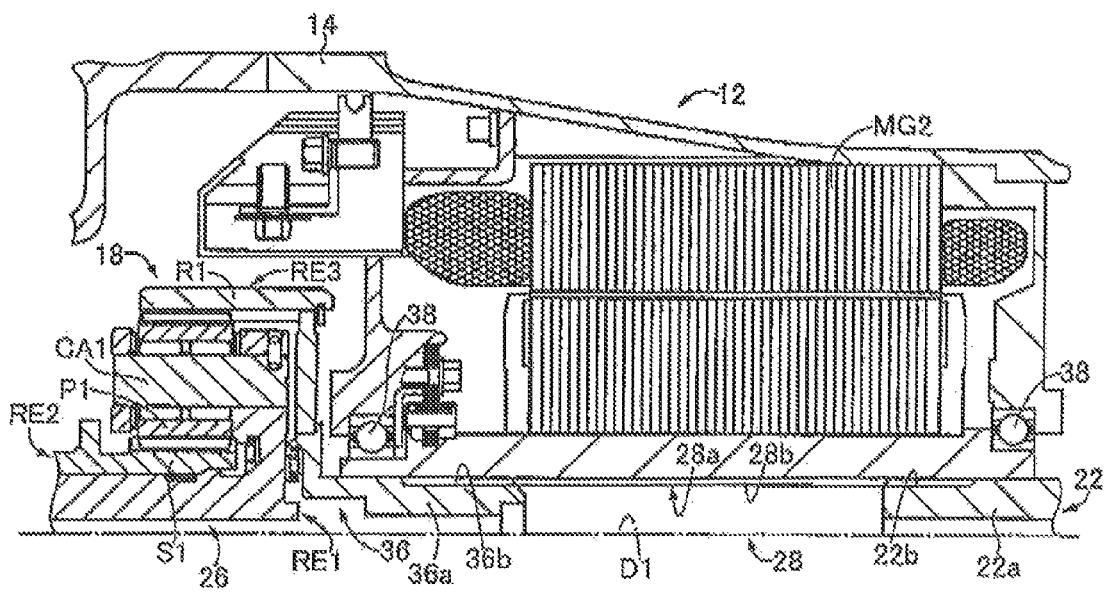
FIG. 2 is a cross-sectional view of a portion of the power transmission device of FIG. 1.

FIG. 2 is a cross-sectional view of a portion of the power transmission device 12. According to FIG. 2, the power transmission device 12 includes an electric differential portion output shaft (hereinafter, an output shaft 36) 36 coupled to the first ring gear R1 of the power distribution mechanism 18 that is an electric differential portion, the rotor shaft 28 of the second electric motor MG2 coupled at one end portion to the output shaft 36, and the shaft-shaped transmitting member 22 coupled to the other end portion of the rotor shaft 28, and the output of the engine 8 and the output of the second electric motor MG2 are selectively transmitted via the transmitting member 22 to a pair of the drive wheels 25.

As depicted in FIG. 2, the rotor shaft 28 of the second electric motor MG2 is a cylinder-shaped cylindrical shaft supported rotatably around a rotation axis D1 by a pair of bearings 38. As depicted in FIG. 2, in the power transmission path from the engine 8 to a pair of the drive wheels 25, a member positioned upstream of the second electric motor MG2 is the output shaft 36, and a member positioned downstream of the second electric motor MG2 is the transmitting member 22. Therefore, the rotor shaft 28 of the second electric motor MG2 is serially interposed in the power transmission path to make up a portion of the power transmission path.

The rotor shaft 28 of the second electric motor MG2 is provided with a substantially column-shaped fitting hole 28a penetrating in the rotation axis D1 direction of the rotor shaft 28 as depicted in FIG. 2, and a cylinder-shaped shaft portion 36a formed at an end portion of the output shaft 36 closer to the rotor shaft 28 is relatively non-rotatably fitted into the fitting hole 28a at an end portion of the rotor shaft 28 closer to the output shaft 36 while a cylinder-shaped shaft portion 22a formed at an end portion of the transmitting member 22 closer to the rotor shaft 28 is relatively non-rotatably fitted into the fitting hole 28a at an end portion of the rotor shaft 28 closer to the transmitting member 22. Therefore, the output of the engine 8 is transmitted from the output shaft 36 through the rotor shaft 28 of the second electric motor MG2 in the axial direction to the transmitting member 22, and a pair of the drive wheels 25 is driven by the transmitting member 22.

An outer circumferential spline groove 36b formed on the outer circumference of a leading end portion of the shaft portion 36a of the output shaft 36 is fitted to an inner circumferential spline tooth 28b formed on an inner circumferential portion of the rotor shaft 28 so that the rotor shaft 28 is relatively non-rotatably coupled to the output shaft 36. An outer circumferential spline groove 22b formed on the outer circumference of a leading end portion of the shaft portion 22a of the transmitting member 22 is fitted to the inner circumferential spline tooth 28b of the rotor shaft 28 so that the rotor shaft 28 is relatively non-rotatably coupled to the transmitting member 22.

As depicted in FIG. 2, the inner circumferential spline teeth 28b formed on the both end portions of the rotor shaft 28 of the second electric motor MG2 are mutually set to the same diameter, and the inner circumferential spline teeth 28b formed on the both end portions of the rotor shaft 28 are formed by, for example, broaching, continuously in the rotation axis D1 direction of the rotor shaft 28.

According to the power transmission device 12 of the hybrid vehicle 10 of this embodiment, the rotor shaft 28 of the second electric motor MG2 makes up a portion of the power transmission path from the engine 8 to a pair of the drive wheels 25. Therefore, while the output of the engine 8 is transmitted through the rotor shaft 28 of the second electric motor MG2 to a pair of drive wheels 25, even when the torque of the second electric motor MG2 comes close to zero, the inner circumferential spline teeth 28b of the rotor shaft 28 of the second electric motor MG2 are always pressed against one side during operation of the engine 8 and the coupling portion of the second electric motor MG2 does not rattle. Thus, even when the torque of the second electric motor MG2 comes close to zero, tooth hitting noise is suppressed without changing the operating point of the engine 8 and the fuel efficiency of the hybrid vehicle 10 is improved.

According to the power transmission device 12 of the hybrid vehicle 10 of this embodiment, the output of the engine 8 is transmitted through the rotor shaft 28 of the second electric motor MG2 to a pair of drive wheels 25. Therefore, while the output of the engine 8 is transmitted through the rotor shaft 28 of the second electric motor MG2 to a pair of drive wheels 25, even when the torque of the second electric motor MG2 comes close to zero, the inner circumferential spline teeth 28b of the rotor shaft 28 of the second electric motor MG2 are always pressed against one side during operation of the engine 8 and the coupling portion of the second electric motor MG2 does not rattle.

According to the power transmission device 12 of the hybrid vehicle 10 of this embodiment, the rotor shaft 28 of the second electric motor MG2 is provided with the inner circumferential spline teeth 28b respectively on the both end portions and the inner circumferential spline teeth 28b are relatively non-rotatably spline-fitted respectively to the output shaft 36 positioned upstream of the second electric motor MG2 and the transmitting member 22 positioned downstream of the second electric motor MG2 in the power transmission path from the engine 8 to a pair of the drive wheels 25. Therefore, the inner circumferential spline teeth 28b formed on the rotor shaft 28 of the second electric motor MG2 can preferably make the entire length of the power transmission device 12 shorter in the rotation axis D1 direction of the rotor shaft 28.

According to the power transmission device 12 of the hybrid vehicle 10 of this embodiment, the inner circumferential spline teeth 28b formed on the both end portions of the rotor shaft 28 of the second electric motor MG2 are mutually set to the same diameter. Therefore, the inner circumferential spline teeth 28b formed on the both end portions of the rotor shaft 28 of the second electric motor MG2 can be formed by using the same machining equipment/cutting tools, which improves the productivity of the rotor shaft 28 of the second electric motor MG2.

According to the power transmission device 12 of the hybrid vehicle 10 of this embodiment, the rotor shaft 28 of the second electric motor MG2 is a cylindrical shaft and the inner circumferential spline teeth 28b formed on the both end portions thereof are continuous in the rotation axis D1 direction of the rotor shaft 28. Therefore, the inner circumferential spline teeth 28b formed on the both end portions of the rotor shaft 28 of the second electric motor MG2 can be manufactured by one branching in the rotation axis D1 direction of the rotor shaft 28, which preferably improves the productivity of the rotor shaft 28 of the second electric motor MG2.

Second Embodiment

Another embodiment of the present invention will be described. In the following description, the portions mutually common to the embodiments are denoted by the same reference numerals and will not be described.

A power transmission device 42 of a hybrid vehicle (hereinafter referred to as a vehicle 40) 40 of this embodiment is different from the power transmission device 12 of the first embodiment in that the power transmission device 42 is preferably used in an FF (front-engine front-drive) vehicle in which the power transmission device 42 is transversally mounted on the vehicle 40, for example.

Figure 3:
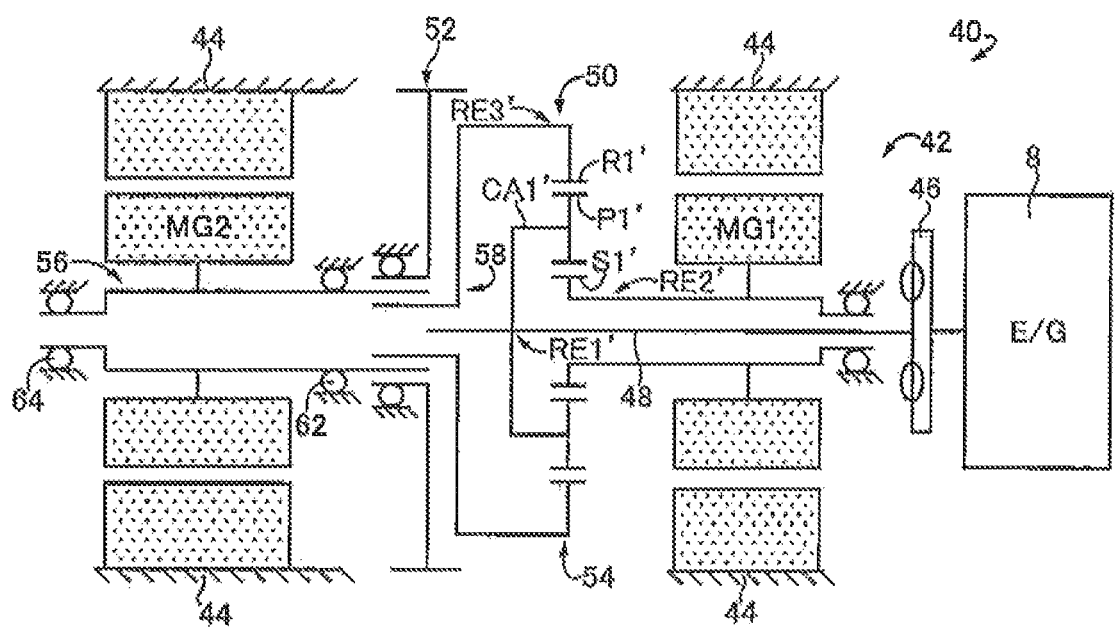
FIG. 3 is a schematic for explaining a power transmission device of a hybrid vehicle that is another embodiment of the present invention.

As depicted in FIG. 3, the power transmission device 42 includes in a transaxle case (hereinafter referred to as a case 44) 44 acting as a non-rotating member attached to a vehicle body, in order from the engine 8 side, a damper 46 operatively coupled to an output shaft (e.g., crankshaft) of the engine 8 and absorbing pulsation due to torque variation etc. from the engine 8, an input shaft 48 rotationally driven via the damper 46 by the engine 8, the first electric motor (first rotator) MG1, a power distribution mechanism (electric differential portion) 50 acting as a differential mechanism, the second electric motor (second rotator) MG2, and an output gear 52 coupled in a power transmittable manner to a pair of the drive wheels 25 not depicted.

The power distribution mechanism 50 includes a single pinion type planetary gear device 54. The planetary gear device 54 includes as rotating elements a first pinion gear P1', a first carrier CA1' acting as a first rotating element RE1' supporting the first pinion gear P1' in a rotatable and revolvable manner, a first sun gear S1' acting as a second rotating element RE3', and a first ring gear R1' as a third rotating element RE3' meshed via the first pinion gear P1' with the first sun gear S1'.

In the power distribution mechanism 50, the first carrier CA1' is coupled to the input shaft 48, i.e., the engine 8; the first sun gear S1' is coupled to the first electric motor MG1; and the first ring gear R1' is coupled via the output gear 52 of the second electric motor MG2 to the transmitting member 22.

Since the first sun gear S1', the first carrier CA1', and the first ring gear R1' are rotatable relative to each other in the power distribution mechanism 50, the output of the engine 8 is distributed to the first electric motor MG1 and the output gear 52; the output of the engine 8 distributed to the first electric motor MG1 causes the first electric motor MG1 to generate electricity; the second electric motor MG2 is rotationally driven by the generated electric energy or stored electric energy; and, therefore, for example, a continuously variable transmission state is achieved such that the rotation of the output gear 52 is continuously varied regardless of a predetermined rotation of the engine 8. In other words, the power distribution mechanism 50 acts as an electric differential portion having a differential state between an input rotation speed (rotation speed of the input shaft 48) and an output rotation speed (rotation speed of the output gear 52) controlled by controlling an operation state through the first electric motor MG1 and the second electric motor MG2.

Figure 4:
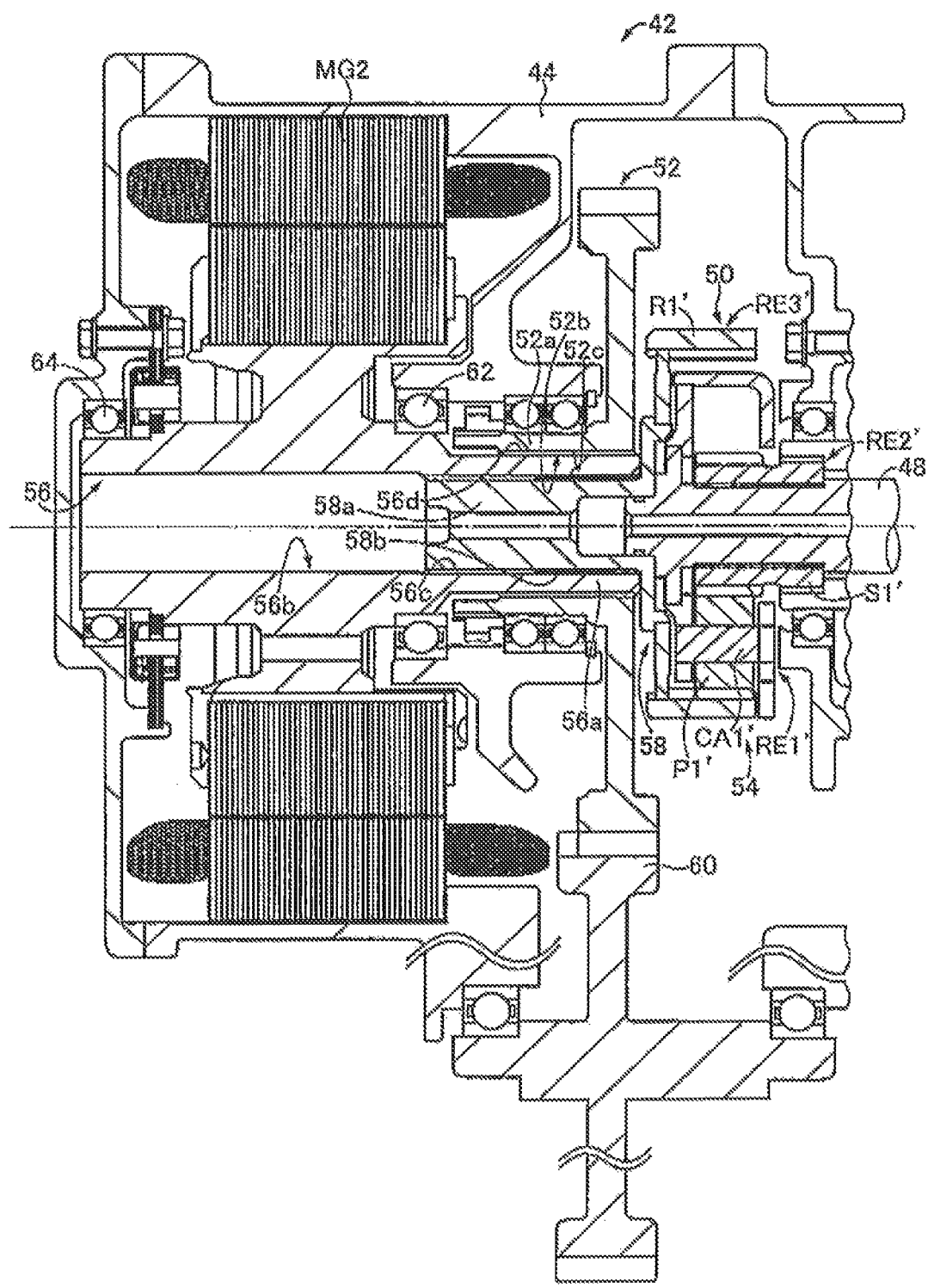
FIG. 4 is a cross-sectional view of a portion of the power transmission device of FIG. 3.

FIG. 4 is a cross-sectional view of a portion of the power transmission device 42. According to FIG. 4, the power transmission device 42 includes an electric differential portion output shaft (hereinafter, an output shaft 58) 58 coupled to the first ring gear R1' of the power distribution mechanism 50 that is an electric differential portion, the rotor shaft 56 of the second electric motor MG2 coupled to the output shaft 58, and the output gear 52 coupled to the rotor shaft 56, and the output of the engine 8 and the output of the second electric motor MG2 are selectively transmitted via the output gear 52 to a pair of the drive wheels 25. When the output of the engine 8 or the output of the second electric motor MG2 is transmitted to the output gear 52 in the power transmission device 42, the output is transmitted from the output gear 52 sequentially through a counter gear 60, a final gear, a differential gear device, a pair of axles, etc. to a pair of the drive wheels 25.

As depicted in FIG. 4, the rotor shaft 56 of the second electric motor MG2 is supported rotatably around a rotation axis D2 by a pair of bearings 62, 64. The rotor shaft 56 includes a cylindrical portion 56a formed into a cylinder shape at a shaft end portion of the rotor shaft 56 closer to the first electric motor MG1. As depicted in FIG. 4, in the power transmission path from the engine 8 to a pair of the drive wheels 25, a member positioned upstream of the second electric motor MG2 is the output shaft 58, and a member positioned downstream of the second electric motor MG2 is the output gear 52. Therefore, the rotor shaft 56 of the second electric motor MG2 is serially interposed in the power transmission path to make up a portion of the power transmission path.

The rotor shaft 56 of the second electric motor MG2 is provided with a substantially column-shaped fitting hole 56b penetrating in the rotation axis D2 direction of the rotor shaft 56 as depicted in FIG. 4, and a substantially cylinder-shaped shaft portion 58a formed at an end portion of the output shaft 58 closer to the rotor shaft 56 is relatively non-rotatably fitted into the fitting hole 56b of the cylindrical portion 56a of the rotor shaft 56 while the outer circumference of the cylindrical portion 56a of the rotor shaft 56 is relatively non-rotatably fitted into a fitting hole 52b of a cylinder-shaped cylindrical portion 52a projecting from a center portion of the output gear 52 toward the side opposite to the first electric motor MG1 in the rotation axis D2 direction. Therefore, the output of the engine 8 is transmitted through the rotor shaft 56 of the second electric motor MG2 in the radial direction to the output gear 52, and a pair of the drive wheels 25 is driven by the output gear 52.

As depicted in FIG. 4, with regard to the rotor shaft 56 and the output shaft 58, an outer circumferential spline groove 58b formed on the outer circumference of a leading end portion of the shaft portion 58a of the output shaft 58 is fitted to an inner circumferential spline tooth 56c formed on the inner circumference of the cylindrical portion 56a of the rotor shaft 56 so that the rotor shaft 56 is relatively non-rotatably coupled to the output shaft 58. As depicted in FIG. 4, with regard to the rotor shaft 56 and the output gear 52, an inner circumferential spline groove 52c formed on the inner circumference of the cylindrical portion 52a of the output gear 52 is fitted to an outer circumferential spline tooth 56d formed on the outer circumference of the cylindrical portion 56a of the rotor shaft 56 so that the rotor shaft 56 is relatively non-rotatably coupled to the output gear 52.

According to the power transmission device 42 of the hybrid vehicle 40 of this embodiment, the rotor shaft 56 of the second electric motor MG2 makes up a portion of the power transmission path from the engine 8 to a pair of the drive wheels 25. Thus, even when the torque of the second electric motor MG2 comes close to zero, tooth hitting noise is suppressed without changing the operating point of the engine 8 and the fuel efficiency of the hybrid vehicle 40 is improved, as the same case of the power transmission device 12 of the hybrid vehicle 10 of the first embodiment.

According to the power transmission device 42 of the hybrid vehicle 40 of this embodiment, the output of the engine 8 is transmitted through the rotor shaft 56 of the second electric motor MG2 to a pair of drive wheels 25. Thus, even when the torque of the second electric motor MG2 comes close to zero, the inner circumferential spline teeth 56c and the outer circumferential spline tooth 56d of the rotor shaft 56 of the second electric motor MG2 are always pressed against one side during operation of the engine 8 and the coupling portion of the second electric motor MG2 does not rattle, as the same case of the power transmission device 12 of the hybrid vehicle 10 of the first embodiment.

According to the power transmission device 42 of the hybrid vehicle 40 of this embodiment, the rotor shaft 56 of the second electric motor MG2 is provided with a pair of the inner circumferential spline tooth 56c and the outer circumferential spline tooth 56d on the cylindrical portion 56a, and the pair of the inner circumferential spline tooth 56c and the outer circumferential spline tooth 56d is respectively spline-fitted to a member positioned upstream of the second electric motor MG2, i.e., the output shaft 58, and a member positioned downstream of the second electric motor MG2, i.e., the output gear 52, in the power transmission path from the engine 8 to the drive wheels 25. Therefore, although the output torque of the second electric motor MG2 is more added to the output gear 52 in the power transmission path than the output shaft 58 in the power transmission path and the required strength of the output gear 52 must be made relatively larger, the diameter of the output gear 52 can preferably be made larger to ensure the strength by disposing the output gear 52 on the outer circumferential side of the rotor shaft 56 of the second electric motor MG2 and, because the shaft portion 58a of the output shaft 58 is disposed on the inner circumferential side of the rotor shaft 56 of the second electric motor MG2, the diameter of the shaft portion 58a of the output shaft 58 may not be made larger in an unnecessary manner and, thus, miniaturization can be achieved.

Although embodiments of the present invention have been described with reference to the drawings, the present invention is also applied in other forms.

For example, although an internal combustion engine, i.e., the engine 8, is used as the drive source of the power transmission device 12, 42 in the power transmission device 12, 42 of the hybrid vehicle 10, 40 of the embodiments, any engine may be used as long as a drive force can be generated for a pair of the drive wheels 25.

in the power transmission device 12, 42 of the hybrid vehicle 10, 40 of the embodiments, the first carrier CA1, CA1' may directly or indirectly be coupled to the engine 8; the first sun gear S1, SE may directly or indirectly be coupled to the first electric motor MG1; and the first ring gear R1, R1' may directly or indirectly be coupled to the rotor shaft 28, 56 of the second electric motor MG2.

Although not exemplarily illustrated one by one, the present invention may be implemented in variously modified and improved forms based on the knowledge of those skilled in the art.

NOMENCLATURE OF ELEMENTS

8: engine
10, 40: vehicle (hybrid vehicle)
12, 42: power transmission device
18, 50: power distribution mechanism (electric differential portion)
22: transmitting member
25: drive wheels
28: rotor shaft
28b: inner circumferential spline tooth
52: output gear
56: rotor shaft
56c: inner circumferential spline tooth
56d: outer circumferential spline tooth
MG1: first electric motor (first rotator)
MG2: second electric motor (second rotator)
RE1, RE1': first rotating element
RE2, RE2': second rotating element
RE3, RE3': third rotating element

The invention claimed is:

1. A power transmission device of a hybrid vehicle comprising: an electric differential portion having a first rotating element coupled to an engine, a second rotating element coupled to a first electric motor, and a third rotating element coupled to a second electric motor, the second electric motor being disposed in a power transmission path including the third rotating element between the engine and drive wheels,
   the second electric motor having a rotor shaft interposed in series in the power transmission path, and making up a portion of the power transmission path,
   the rotor shaft of the second electric motor having a pair of inner circumferential spline teeth formed respectively on both end portions thereof, and
   the pair of the inner circumferential spline teeth being respectively spline-fitted to a member positioned upstream of the second electric motor and a member positioned downstream of the second electric motor in the power transmission path.

2. The power transmission device of a hybrid vehicle of claim 1, wherein output of the engine is transmitted through the rotor shaft of the second electric motor to the drive wheels.

3. The power transmission device of a hybrid vehicle of claim 1, wherein the inner circumferential spline teeth formed on the both end portions of the rotor shaft of the second electric motor are mutually set to the same diameter.

4. The power transmission device of a hybrid vehicle of claim 3, wherein the rotor shaft of the second electric motor is a cylindrical shaft, and wherein the inner circumferential spline teeth formed on the both end portions are continuous in axial direction.

5. A power transmission device of a hybrid vehicle comprising: an electric differential portion having a first rotating element coupled to an engine, a second rotating element coupled to a first electric motor, and a third rotating element coupled to a second electric motor, the second electric motor being disposed in a power transmission path including the third rotating element between the engine and drive wheels, comprising:
   a first transmitting member coupled in a power transmittable manner to the third rotating element, and
   a second transmitting member coupled in a power transmittable manner to the drive wheels and formed separately from the first transmitting member,
   a rotor shaft of the second electric motor being coupled, respectively, to the first transmitting member and the second transmitting member, and the first transmitting member and the second transmitting member being separated from each other,
   the rotor shaft of the second electric motor having a pair of an inner circumferential spline teeth and an outer circumferential spline teeth formed on one shaft end portion thereof, and
   the pair of the inner circumferential spline teeth and the outer circumferential spline teeth being respectively spline-fitted to a member positioned upstream of the second electric motor and a member positioned downstream of the second electric motor in the power transmission path.

* * * * *